Figure 1:
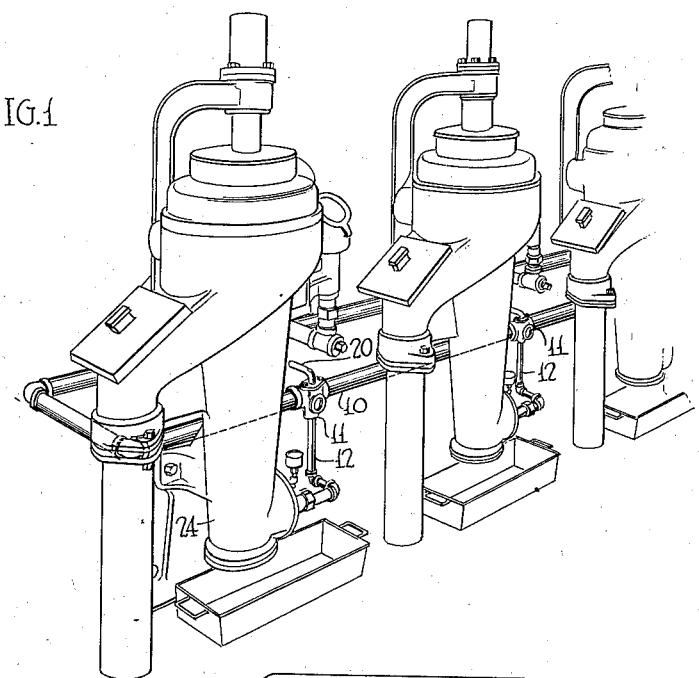

Oct. 5, 1937.　　　L. D. JONES　　　2,095,217

LIQUID FEEDING AND TREATING SYSTEM

Filed May 16, 1934

INVENTOR.
Leo. D. Jones
BY Maurice R. Crews
ATTORNEY.

Patented Oct. 5, 1937

2,095,217

UNITED STATES PATENT OFFICE 2,095,217

LIQUID FEEDING AND TREATING SYSTEM

Leo D. Jones, Philadelphia, Pa., assignor to The Sharples Specialty Company, Philadelphia, Pa., a corporation of Delaware Application May 16, 1934, Serial No. 725,875

9 Claims. (Cl. 210—80)

The present invention relates to the art of chemically treating liquid products and to the feed of such products to apparatus for effecting treatment thereof. It is especially adapted to the feed and treatment of viscous liquids having a tendency to solidify in the feed pipes and was conceived with reference to the treatment of petroleum oils with sulphuric acid to produce an acid sludge and the subsequent separation of sludge from oil by centrifugal force.

In the acid treatment of lubricating oil stock, a suspension of viscous adhesive sludge is formed which has a strong tendency to separate from the oil by subsidence. Precautions must accordingly be taken in connection with the design of systems for feeding a suspension of such sludge in oil to centrifugal separators or the like in order to prevent deposition and solidification of the sludge within parts of the feeding system and consequent necessity for frequent shut-downs for the purpose of cleaning deposited sludge from the system. In cases in which relatively quiescent bodies of sludge-containing oil are allowed to stand in portions of the feeding system, such deposition is unusually likely to occur, and the present invention was conceived with especial reference to the avoidance of sludge deposition in portions of such a system.

The system of the present invention was especially designed for use in connection with the practice of the process described and claimed in my copending application Serial No. 671,064, filed May 15, 1933, for Method and apparatus for treating petroleum stock. In the practice of the process of that application, a body of sludge-containing oil discharged from an acid mixing chamber is fed to a battery of centrifugal separators arranged in parallel. It is, of course, desirable in the practice of a separating process with respect to such discharged material, to avoid undue solidification or precipitation of sludge in any portion of the system interconnecting the mixer with the battery of centrifugal separators. In my co-pending applications Serial Numbers 725,874 and 725,876 respectively, (Sharples Specialty Company cases Nos. 169 and 186, respectively), filed of even date herewith, I have described alternative methods and apparatus for avoiding such precipitation and/or solidification in the main body of the conduits interconnecting the mixer and the centrifuges. By the use of the methods and apparatus of these concurrently filed applications, it is possible to effectively avoid rapid solidification of sludge in the main body of the conduit, as the oil-sludge mixture is maintained in continuous motion in the main body of the conduit in the practice of these inventions even at times when the operation of one or more of the treating units is discontinued. In connection with the practice of these inventions, however, difficulty is still encountered with the feed of fluid to the individual treating units from the main conduit interconnecting the mixer and the respective treating units. In cases in which a body of quiescent liquid is allowed to remain in any one of the parallel conduits interconnecting this main conduit with the respective treating units upon discontinuance of use of a treating unit receiving fluid therefrom, said fluid tends to solidify and clog the conduit in which such quiescence occurs. It is the aim of the present invention to avoid this inconvenience by the use of an apparatus and method of feeding fluid material from the main conduit to the respective treating units whereby the existence of such quiescent bodies of fluid is avoided.

Further objects and advantages of the invention will be obvious from a reading of the sub-joined specification in the light of the attached drawing, in which Figure 1 is a perspective view of a part of the battery of centrifugal separators and parts of the feeding system by which fluid material is fed to these separators in the practice of the invention.

Figure 2:
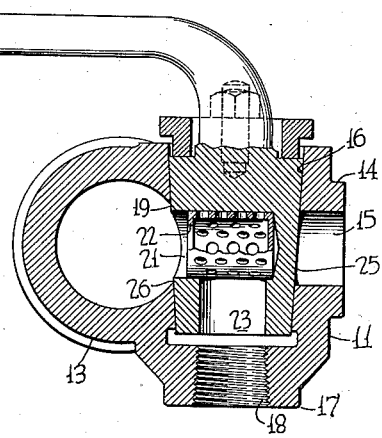
Figure 3:
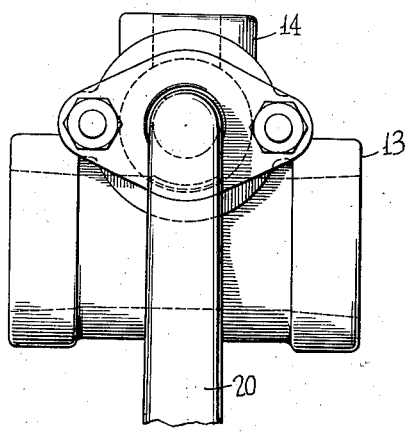

Fig. 2 is a detailed cross section through a valve forming an important element of the invention, and Fig. 3 is a plan view of the valve illustrated in Fig. 2.

As the invention was conceived as a solution of the specific problem of separating viscous acid sludge from lubricating oil stock, it will be described with reference to that problem.

Referring to the drawing by reference characters, the treating system comprises in general a mixing tank from which a fluid material, such as oil containing sludge formed by intimate admixture of sulphuric acid therewith may be fed into a main conduit 10 from which it is passed through valves 11 and parallel conduits 12 to a battery of centrifugal separators 24 in which a separation of sludge from oil occurs as the result of subsidence occurring within the rotors of the centrifugal separators and separate discharge of the oil and sludge. Deposition of sludge from oil in the main conduit 10 is effectively avoided by the adoption of one of the expedients of my co-pending concurrently filed applications referred to above, both of which involve the maintenance of continuous flow of oil through all parts of the conduit 10 regardless of whether all of the centrifugal separators are operated or the operation of one or more of these separators is discontinued.

The present invention relates primarily to the problem of avoiding solidification of sludge within any one of the parallel conduits 12 during the interval in which feed of oil through such conduit is discontinued. Such discontinuance of feed is occasionally necessary for the purpose of cleaning deposited sludge from the centrifugal rotor and associated parts. Upon the discontinuance of feed through one of the parallel conduits 12, sludge contained in the oil in the conduit in question has a tendency to be precipitated from the oil and to solidify and clog the conduit if it is allowed to remain therein. It is accordingly the object of the present invention to effect prompt and complete removal of liquid from a conduit 12 and associated parts upon discontinuance of feed through such conduit. To this end, in the practice of the invention, the flow of oil into any portion of a conduit 12 is completely avoided upon discontinuance of feed through such conduit to its associated centrifugal separator and oil remaining in the conduit at the moment of such discontinuance is promptly expelled therefrom. The invention also contemplates the avoidance of passage of large impurities to the centrifugal separator units. For this purpose, a strainer is associated with each of the branch conduits 12, these strainer members being mounted in the valves 11 in a novel manner in order to afford provision for cleaning them upon any occasion on which feed to one of the centrifugal separators is discontinued.

Each of the valves 11 constitutes a housing 13, which may form a connection between successive sections of the conduit 10, as illustrated, and a flow-controlling member or cock 19 mounted within an opening 16 of the housing and communicating with a lateral opening 26 therein. The valve housing includes a rearward projection 14 which is cut away as illustrated at 15 to afford communication between a source of pressure, such as the outside atmosphere, and the valve cock 19. A projection 17 may be screw-threaded, as indicated at 18, to afford connection between the valve 11 and the conduit 12. The valve cock 19 is provided with a radially extending bore 21 in which a strainer member 22 may be seated and with a bore 23 interconnecting the bore 21 with the portion of the valve which is secured to the conduit 12. A handle 20 is secured to the valve cock 19 and affords provision for the manipulation thereof.

In the use of the valve 11 and the system of my invention, oil will flow freely through the valve cock 19 from the conduit 10 to the conduit 12 when the cock is maintained in the position illustrated in Fig. 2. When each of the cocks is arranged in this position, there will therefore be simultaneous parallel feed to the respective separators of the system. When it is desired to discontinue the feed of oil to one or more of the centrifugal separators, the valve handle 20 associated with the valve controlling feed of oil into the conduit 12 associated with the separator in question is rotated from the position illustrated in Figs. 1 and 2 through an angle of 180°. The imperforate portion 25 of the valve cock 19 will then lie adjacent the opening 26 in the valve housing 13 and contact the line of flow of oil through the conduit 10, thereby preventing further flow of oil into the conduit 12 or into any part of the valve mechanism. Rotation of the valve cock in this manner also brings the bore 21 into register with the opening 15 in the rear of the valve housing and affords provision for communication between the opening 15 and the interior of the conduit 12. This allows liquid remaining in the conduit 12 to be subjected to the external atmosphere or any other suitable source of pressure and therefore prevents the maintenance of a condition of air-lock in the conduits 12 thereby effecting discharge of sludge-containing oil from that conduit under the influence of gravity. It will also be seen that the strainer 22 may be removed from the bore 21 in the valve cock 19 when the parts are in this position and that this strainer may, therefore, be removed for cleaning upon any occasion on which the valve cock is moved to flow-preventing position. From the above discussion it will be evident that the use of the apparatus and method of the invention precludes the existence of a quiescent body of sludge-containing oil in a conduit 12 or associated parts during the discontinuance of feed of oil through such conduit.

In the particular embodiment of the invention illustrated in the drawing, the lower end of the conduit 12 is in contact with the atmosphere and liquid may, therefore, flow downwardly through that conduit under the force of gravity and atmospheric pressure upon actuation of the valve to flow-preventing position. In cases in which the invention is adapted to uses involving control of conduits not so open to the atmosphere, it will, of course, be evident that provision must be made for the discharge of fluid from the lower end of the conduit. While the invention has been described specifically with reference to the feed of sludge-containing oil to a battery of centrifugal separators, it will be evident that it has application to the feed of other fluid substances, having a tendency to deposit solid material or to solidify in conduits, to units in which such fluid material is subjected to treatment, whether or not such treatment involves centrifugal separation.

Modifications will be obvious to those skilled in the art and I do not, therefore, wish to be limited except by the scope of the sub-joined claims.

I claim:

1. In a system for feeding a fluid material, a main conduit for feeding said material, a second conduit interconnected with an intermediate portion of said main conduit and a rotary valve having a portion of its circumference cut away and provided with an opening which communicates with an opening in the main conduit to effect communication between said second conduit and said main conduit when said valve is actuated to open position, said valve having an imperforate portion of its circumference shaped to close the opening in the main conduit when the valve is actuated to flow-preventing position, whereby fluid material may be passed through said main conduit upon actuation of the valve to flow-preventing position but no fluid material is passed into said valve or said second conduit upon such actuation to flow-preventing position.

2. In a system for feeding a fluid material, a main conduit for feeding said material, a second conduit interconnected with an intermediate portion of said main conduit and a rotary valve having a portion of its circumference cut away and provided with an opening which communicates with an opening in the main conduit to effect communication between said second conduit and said main conduit when said valve is actuated to open position, said valve having an imperforate portion of its circumference shaped to close the opening in the main conduit when the valve is actuated to flow-preventing position, whereby fluid material may be passed through said main conduit upon actuation of the valve to flow-preventing position but no fluid material is passed into said valve or said second conduit upon such actuation to flow-preventing position, said valve being provided with an opening which establishes communication between said second conduit and a zone of external pressure upon actuation of the valve to flow-preventing position.

3. In a system for feeding a fluid material, a main conduit for feeding said material, a second conduit interconnected with an intermediate portion of said main conduit and a rotary valve having a portion of its circumference cut away and provided with an opening which communicates with an opening in the main conduit to effect communication between said second conduit and said main conduit when said valve is actuated to open position, said valve having an imperforate portion of its circumference shaped to close the opening in the main conduit when the valve is actuated to flow-preventing position, whereby fluid material may be passed through said main conduit upon actuation of the valve to flow-preventing position but no fluid material is passed into said valve or said second conduit upon such actuation to flow-preventing position, said valve incorporating a strainer through which liquid passes during its flow through the valve.

4. In a system for feeding a fluid material, a main conduit for feeding said material, a second conduit interconnected with an intermediate portion of said main conduit and a valve adapted selectively to permit or prevent flow of material through said second conduit, said valve incorporating means adapted to contact the line of flow of material in the main conduit and thereby to prevent flow of material into any part of the second conduit upon actuation of the valve to flow-preventing position and said valve also incorporating a strainer through which liquid passes during its flow through the valve, said strainer being mounted in an opening in the valve which is larger than said strainer and designed to register with the main conduit upon actuation of the valve to flow-permitting position and with an opening in the valve housing communicating with the outside atmosphere upon actuation of the valve to flow-preventing position, whereby said strainer may be removed for cleaning upon actuation of said valve to flow-preventing position.

5. In a system for feeding a fluid material, a main conduit for feeding said material, a second conduit interconnected with an intermediate portion of said main conduit and a valve adapted selectively to permit or prevent flow of material through said second conduit, said valve comprising a valve housing and a valve cock, said housing being interconnected with the main conduit adjacent its point of juncture with the second conduit, said valve cock including an opening adapted to register with the main conduit upon actuation of the valve cock to flow-permitting position and to register with an external source of pressure upon actuation of the valve cock to flow-preventing position and a strainer seated within the aforesaid opening in said valve cock, said opening in said valve cock being larger than said strainer, whereby to permit removal of said strainer when said valve is actuated to flow-preventing position.

6. In a liquid feeding apparatus, the combination comprising a conduit through which liquid is adapted to flow, a valve cock incorporated in said conduit and adapted selectively to permit or prevent flow of liquid therethrough, and a strainer incorporated in said valve cock in a position which intersects the line of liquid flow when said cock is adjusted to flow permitting position, the conduit being provided with an opening which is larger than said strainer and which is closed by said valve cock when the valve cock is in flow-permitting position but which communicates with the position of the strainer when the cock is adjusted to flow preventing position, whereby to permit removal and cleaning of said strainer when the cock is moved to flow preventing position.

7. In a system for feeding a fluid material, a main conduit for feeding said material, a second conduit interconnected with an intermediate portion of said main conduit and a rotary valve having a portion of its circumference cut away and provided with an opening which communicates with an opening in the main conduit to effect communication between said second conduit and said main conduit when said valve is actuated to open position, said valve having an imperforate portion of its circumference shaped to close the opening in the main conduit when the valve is actuated to flow-preventing position, whereby fluid material may be passed through said main conduit upon actuation of the valve to flow-preventing position but no fluid material is passed into said valve or said second conduit upon such actuation to flow-preventing position, said valve being provided with an opening which establishes communication between said second conduit and a zone of atmospheric pressure through an opening in the valve housing upon actuation of the valve to flow-preventing position.

8. A valve comprising a rotary main body portion, a housing within which said rotary portion is adapted to be rotated, an opening in the circumference of said rotary portion adapted to establish communication with an opening in an associated conduit, and an opening in the housing adapted to communicate with one of said first mentioned openings upon actuation of the valve to flow-preventing position, said rotary portion having an imperforate part adapted to close the opening in said associated conduit upon actuation to flow-preventing position.

9. A valve comprising a rotary main body portion, a housing within which said rotary portion is adapted to be rotated, an opening in the circumference of said rotary portion adapted to establish communication with an opening in an associated conduit, and a strainer incorporated in said rotary portion and adapted to communicate with the outside atmosphere upon actuation of said valve to flow-preventing position, said rotary portion having an imperforate part adapted to close the opening in said associated conduit upon actuation to flow-preventing position.

LEO D. JONES.